(12) United States Patent
Brosnan

(10) Patent No.: US 6,512,867 B2
(45) Date of Patent: Jan. 28, 2003

(54) PARALLEL SIDE-PUMPING OF DUAL-CLAD FIBER ARRAY USING FUSED, LAYERED STRUCTURE

(75) Inventor: Stephen J. Brosnan, San Pedro, CA (US)

(73) Assignee: TRW Inc., Redondo Beach, CA (US)

( * ) Notice: Subject to any disclaimer, the term of this patent is extended or adjusted under 35 U.S.C. 154(b) by 99 days.

(21) Appl. No.: 09/725,662

(22) Filed: Nov. 29, 2000

(65) Prior Publication Data

US 2002/0064342 A1 May 30, 2002

(51) Int. Cl.⁷ .................................................. G02B 6/26
(52) U.S. Cl. ............................................ 385/27; 385/96
(58) Field of Search ................................ 385/27–30, 95, 385/96, 114

(56) References Cited

U.S. PATENT DOCUMENTS 5,864,644 A    1/1999  DiGiovanni et al.
5,999,673 A  * 12/1999  Valentin et al. ................ 385/43
6,130,981 A  * 10/2000  Nelson et al. ............... 385/123

* cited by examiner

Primary Examiner—Ellen E. Kim

(57) ABSTRACT

A dual-clad fiber laser employs a multi-mode pump fiber array for introducing pump light into a dual-clad fiber array along the length of the array. Each fiber in the dual-clad fiber array includes a single mode core, a multi-mode inner cladding layer and an outer cladding layer. Each fiber in the multi-mode fiber array includes a multimode core and an outer cladding layer. The inner cladding layer and the core are the same material and the outer cladding layers are the same material. The dual-clad fiber array is a fiber ribbon wound on a bobbin. The multi-mode pump fiber array is a fiber ribbon that is wrapped around the outside of the dual-clad fiber ribbon on the bobbin. A doped silica frit is placed between the fiber ribbons, where the dopant makes the frit have an index of refraction greater than the index of refraction of the outer layers.

19 Claims, 1 Drawing Sheet

PARALLEL SIDE-PUMPING OF DUAL-CLAD FIBER ARRAY USING FUSED, LAYERED STRUCTURE

BACKGROUND OF THE INVENTION

1. Field of the Invention

This invention relates generally to a dual-clad fiber laser and, more particularly, to a dual-clad fiber laser employing a dual-clad fiber array and a multi-mode pump array that are fused together with a doped silica frit so that a pump beam introduced into the pump array is able to propagate into the dual-clad array.

2. Discussion of the Related Art

Dual-clad fiber amplifiers or lasers are well known devices for providing high power optical beams in a variety of applications. The known dual-clad fiber lasers typically employ an array of fibers, where each fiber in the array includes a single-mode (SM) core, a multi-mode inner cladding layer formed around the core, and a thin outer cladding layer formed around the inner cladding layer. The inner cladding layer typically makes up the bulk of the fiber. The fibers are made of a suitable optical waveguide material, such as silica, where the core is doped with a material, such as ytterbium, that increases the index of refraction of the silica, the inner cladding layer is undoped silica, and the outer cladding layer is doped with a material, such as fluorine, that decreases the index of refraction of the silica. Therefore, the core has the highest index of refraction and the outer cladding layer has the lowest index of refraction. Thus, light propagating down the core is reflected off of the interface between the core and the inner cladding layer, and light propagating down the inner cladding layer is reflected off of the interface between the inner cladding layer and the outer cladding layer. Because the core has a higher index of refraction than the inner cladding layer, light in the inner cladding layer crosses the core as it propagates down the fiber.

A pump beam is introduced into the inner cladding layer through an end of each fiber at an incident angle greater than the critical angle, so that the pump beam is trapped by internal reflections in the inner cladding layer as it propagates down the fiber. A signal beam is introduced into the core through an end of each fiber at an angle greater than the critical incident angle so that the signal beam is trapped by internal reflections in the core as it propagates down the fiber. As the pump beam propagates down the fiber and is reflected off of the interface between the inner cladding layer and the outer cladding layer, it crosses the core. The atoms forming the laser medium, such as ytterbium, in the core absorb the pump light, which increases the internal energy of the atoms. The increased energy of the laser atoms within the core is transferred to the signal beam by stimulated emission so that the signal beam is amplified. The specific physics of the transfer of energy from the pump light to the signal light in a dual-clad fiber laser of the type being described herein is well understood to those skilled in the art.

The diameter and number of fibers in a dual-clad fiber array depends on the amount of power an individual fiber can provide and the amount of optical power desired. In one example, the core of each fiber has a diameter of 10 microns, the inner cladding layer has a diameter of 200–400 microns, and the outer cladding layer has a thickness of 10–20 microns. Further, the wavelength of light used for the pump light and the signal light is also application specific. In one example, the pump light has a wavelength of about 920–950 nm and the signal light has a wavelength of about 1060–1090 nm.

The amount of signal beam amplification in each fiber is proportional to the amount of pump light absorbed in the core. For high power applications, it is necessary that the pump light be efficiently coupled into the core along the length of the dual-clad fibers. The known techniques for coupling the pump light into the inner cladding layers generally require a separate optical source for introducing the pump beam into an end of each fiber. This process is typically labor-intensive, and therefore usually unsuitable for high power applications. These techniques can be improved upon to provide an alignment-free, complete in-fiber and massively parallel process for coupling the pump beam into the core.

Improvements have been made in the art for coupling pump light into the inner cladding layer of a fiber associated with a dual-clad fiber laser. In one design, a single-mode fiber is surrounded by a plurality of multi-mode fibers that are similar to the dual-clad fiber, but with the single mode core removed. This bundle of fibers is heated and stretched so that the bundle is tapered to a smaller diameter. The tapered bundle is then fusion spliced to another dual-clad fiber so that the plurality of tapered multiple mode fibers align with the inner cladding layer of the other dual-clad fiber, and the core of the single-mode fiber at the center of the tapered bundle is aligned with the single mode core of the dual-clad fiber. Pump light coupled into the ends of the multi-mode fibers opposite to the dual-clad fiber propagates down the multi-mode fibers and into the inner cladding layer of the dual-clad fiber. Optical amplification of the signal beam is then provided in the core of the dual-clad fiber. U.S. Pat. No. 5,864,644 issued to DiGiovanni et al. discloses a cladding-pump fiber device of this type.

Although the above-described technique is effective for coupling pump light into an inner cladding of a dual-clad fiber, improvements can be made. What is needed is an improved technique for coupling pump light into a dual-clad fiber laser or amplifier array, that is alignment-free, completely in-fiber and massively parallel. It is therefore an object of the present invention to provide such a laser or amplifier.

SUMMARY OF THE INVENTION

In accordance with the teachings of the present invention, a dual-clad fiber laser is disclosed that employs a multi-mode pump fiber array for introducing pump light into a dual-clad fiber array along the length of the array. Each fiber in the dual-clad fiber array includes a single mode core, a multi-mode inner cladding layer and an outer cladding layer. Each fiber in the multi-mode fiber array includes an inner portion and an outer cladding layer. The inner cladding layer and the inner portion are the same material, and the outer cladding layers of the fiber array and the pump array are the same material. In one embodiment, the dual-clad fiber array is a fiber ribbon that is wound on a bobbin, and the multi-mode pump fiber array is a fiber ribbon that is wrapped around the outside of the dual-clad fiber ribbon.

A doped silica frit is placed between the pump ribbon and the fiber ribbon, where the dopant makes the frit have an index of refraction that is greater than the index of refraction of the inner portion and the inner cladding layer and therefore also greater than the index of refraction of the outer cladding layers. The assembly is heated so that the silica is softened. The silica frit, a portion of the outer cladding layer and the inner cladding layer of the fibers in the dual-clad fiber ribbon, and a portion of the cladding layer and the multimode core of the pump ribbon fuse together so that the index of refraction of the fused material is about the same as silica. Therefore, the outer cladding barrier where the dual-clad fibers and the pump fibers meet is removed, and pump light that is introduced into any of the fibers of the pump ribbon is free to cross into the inner cladding layer of all of the fibers in the dual-clad ribbon. The remaining portion of the outer cladding layers provides an outer optical barrier for containing the pump light in the fused structure.

Additional objects, features and advantages of the present invention will become apparent from the following description and appended claims taken in conjunction with the accompanying drawings.

DETAILED DESCRIPTION OF THE PREFERRED EMBODIMENTS

The following discussion of the preferred embodiments directed to a dual-clad fiber laser or amplifier employing a multi-mode pump ribbon is merely exemplary in nature and is in no way intended to limit the invention or its application or uses.

Figure 1:
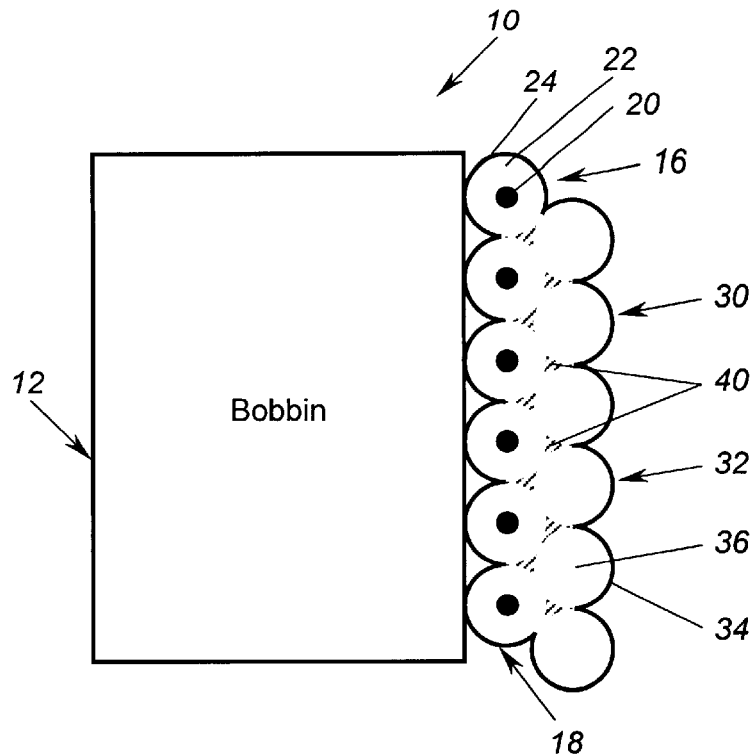
FIG. 1 is a cross-sectional view of an optical fiber assembly for a dual-clad fiber laser, according to an embodiment of the present invention.

FIG. 1 is a cross-sectional view of an optical fiber assembly 10 for a dual-clad fiber laser or amplifier, according to an embodiment of the present invention. The assembly 10 includes a cylindrical bobbin 12 made of a suitable heat conductive material, such as a heat conductive metal. The bobbin 12 is cooled, by a suitable cooling system, such as a flow of water or air, to draw heat away from the assembly 10. A dual-clad fiber ribbon 16 is wrapped around the bobbin 12 so that each of a plurality of fibers 18 of the ribbon 16 is in contact with the bobbin 12. In this example, the ribbon 16 includes six fibers 18, however, as will be appreciated by those skilled in the art, more or less fibers in other designs can be employed.

Each fiber 18 includes a single mode core 20, an inner cladding layer 22 and an outer cladding layer 24. The core 20 is made of a suitable optical propagation medium, such as silica, that is doped with a suitable dopant, such as ytterbium and/or germanium, to increase the index of refraction of the silica. The inner cladding layer 22 is also made of a suitable optical propagation medium, such as undoped silica. The outer cladding layer 24 is also made of a suitable optical propagation medium, such as silica, that is doped with a suitable dopant, such as fluorine, to decrease the index of refraction of the silica. Therefore, signal light propagating in the core 20 is reflected off of the interface between the core 20 and the inner cladding layer 22, and pump light propagating in the inner cladding layer 22 is reflected off the interface between the inner cladding layer 22 and the outer cladding layer 24.

The diameter of the fibers 18, the number of fibers 18 in the ribbon 16, and the number of ribbons 16 in the assembly 10 are all application specific depending on the particular use and power requirements of the laser. Likewise, the size of the bobbin 12 is dependent on various factors, including the maximum bend radius of the fibers 18, the amount of heat generated, etc. In the embodiment discussed herein, all of the core 20, the inner cladding layer 22, and the outer cladding layer 24 are made of silica. However, in alternate embodiments, different optical propagation mediums can be used without departing from the spirit of the present invention.

According to the invention, a multi-mode pump fiber ribbon 30 is wrapped around the outside of the ribbon 16, as shown, The ribbon 30 includes a plurality of fibers 32, where each fiber 32 includes an outer cladding layer 34 and a multimode core 36. In this embodiment, the outer cladding layer 34 is silica doped with fluorine, and is the same as the outer cladding layer 24. The multimode core 36 is undoped silica, and is the same as the inner cladding layer 22. Each fiber 32 is basically the same as each fiber 18, except that the single-mode core 20 has been eliminated from the fibers 32. In this embodiment each of the fibers 32 is positioned between two of the fibers 18, as shown, in a stacked configuration, however, other configurations may be employed. Also, in this embodiment, the fibers 18 and 32 have the same diameter. However, in alternate embodiments, the fibers 18 and 32 can have different diameters.

According to the invention, during manufacture of the assembly 10, a silica frit is formed on the fiber ribbon 16 before the fiber ribbon 30 is wrapped around the ribbon 16. The frit can be formed between the ribbons 16 and 30 at any suitable time during manufacture of the assembly 10, such as after the ribbon 16 is wrapped on the bobbin 12, or before, where the combination of the ribbons 16 and 30 is wrapped on the bobbin 12. The silica frit includes dopant ions that change the index of refraction of the frit to be greater than the index of refraction of undoped silica, and so therefore greater than the index of refraction of the outer layer 24.

The ribbons 16 and 30 are heated so that the silica in the ribbons 16 and 30 softens. This causes the frit, the outer cladding layers 24, the cladding layers 34 and proximate areas of the inner cladding layers 22 and the multimode cores 36 to fuse together, and define a fusion region 40 that bonds the ribbons 16 and 30 together. The dopant ions in the frit 40 and the outer layers 24 and 34 combine to generate an optical material having about the same index of refraction as the inner cladding layers 22 and the multimode cores 36. In other words, when the ribbons 16 and 30 are heated, the dopants in the frit and the outer cladding layers 24 and 34 that are in contact with each other diffuse, so that the resulting material has an index of refraction about the same as the inner cladding layers 22 and the multimode cores 36. Those parts of the outer cladding layers 24 and 34 that are not in contact with the frit prior to the heating step remain the same.

In this configuration, pump light that is introduced into the ribbon 30 is free to enter the fibers 18 and the core 20. The pump light can be introduced into the ribbon 30 at any suitable location at the end of any of the fibers 32. The remaining portion of the outer cladding layer 24 and the outer layer 34 that are not part of the fusion region 40 confines the pump light within the complete structure.

Figure 2:
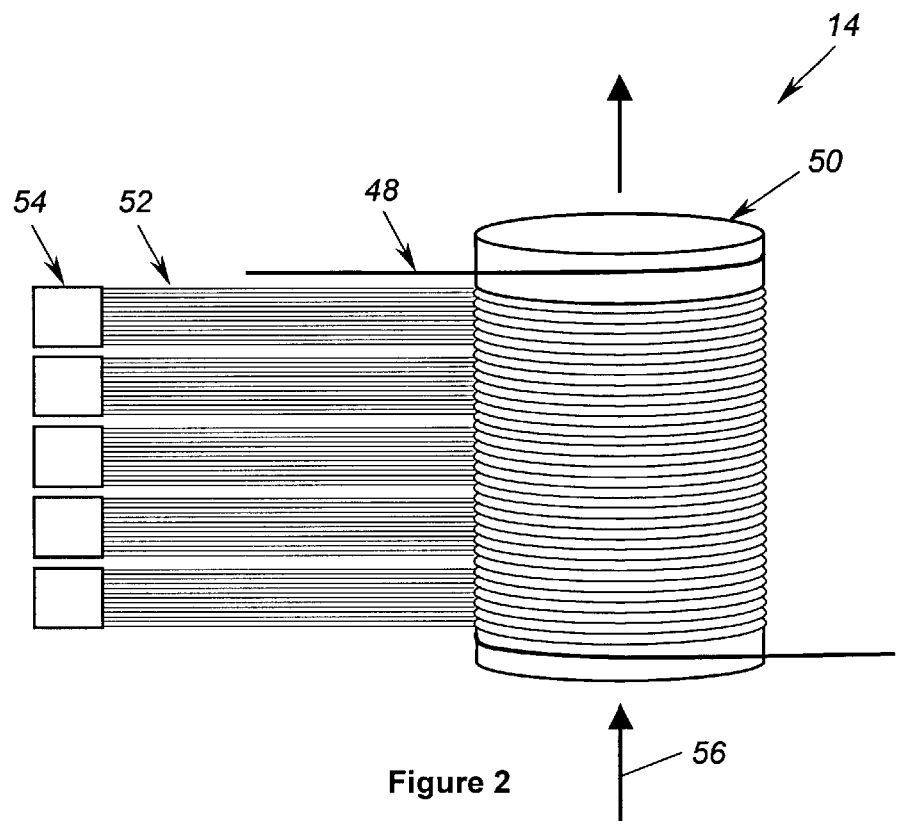
FIG. 2 is a plan view of a laser system employing the fiber assembly shown in FIG. 1, according to the invention.

FIG. 2 is a plan view of a laser system 14 employing an optical fiber assembly similar to the assembly 10 discussed above. The system 14 includes a dual-clad signal fiber 48 wound on a bobbin 50. The fiber 48 is intended to represent any suitable combination of fibers or ribbons within the scope of the present invention. A plurality of separate pump ribbons 52 are then wound on the bobbin 50 over the fiber 48, and fused thereto by a silica frit, as discussed above. The ribbons 52 are wrapped once around the bobbin 50, and have a blocked end. Each pump ribbon 52 is optically coupled to a fiber-coupled high-brightness pump source 54. A coolant flow 56 flows through the bobbin 50 to cool the system 14.

The signal beam is introduced into the signal fiber 48, and propagates down the core of the fiber 48. The pump sources 54 provide pump light into each pump ribbon 52 that enters the fiber 48 at various locations completely around the bobbin 50. Therefore, pump light is effectively coupled into the sides of the fiber 48 for light amplification purposes.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A dual-clad fiber laser for amplifying an optical signal, said laser comprising:
    a single fiber responsive to the optical signal, said signal fiber including a single mode core, an inner cladding layer and an outer cladding layer;
    a pump fiber responsive to pump light, said pump fiber including a multimode core and an outer cladding layer, said signal fiber being in contact with and fused to the pump fiber at a fusion region along a length of the signal fiber; and
    a fusion layer for fusing the signal fiber to the pump fiber at the fusion region, said fusion layer causing a portion of the outer cladding layer of the signal fiber and a portion of the outer cladding layer of the pump fiber to change their index of refraction so that the fusion layer, the portion of the outer cladding layer of the signal fiber, the portion of the cladding layer of the pump fiber, the inner cladding layer and the multimode core have substantially the same index of refraction so that the pump signal enters the signal fiber from the pump fiber, wherein the outer cladding layers confine the pump signal within the combination of the signal fiber and the pump fiber.

2. The laser according to claim 1 including an array of signal fibers bonded together, and an array of pump fibers bonded together.

3. The laser according to claim 2 wherein the array of signal fibers is a one-dimensional signal fiber ribbon, and the array of pump fibers is a one-dimensional pump fiber ribbon, said signal fiber ribbon being fused to the pump fiber ribbon along a length of the signal fiber ribbon.

4. The laser according to claim 3 wherein the signal fiber ribbon is wrapped around a bobbin and the pump fiber ribbon is wrapped around the signal fiber ribbon.

5. The laser according to claim 4 further comprising a cooling system for cooling the bobbin.

6. The laser according to claim 1 wherein the fusion region is formed from a doped silica frit.

7. The laser according to claim 6 wherein the silica frit is doped with germanium.

8. The laser according to claim 1 wherein the multimode core is undoped silica, and the cladding layer of the pump fiber is silica doped with a dopant that reduces the index of refraction of the silica.

9. A dual-clad fiber laser for amplifying an optical signal, said laser comprising:
    a first fiber array including a plurality of fibers, each fiber in the first fiber array including a single mode core having a core index of refraction, an inner cladding layer having an inner cladding layer index of refraction and an outer cladding layer having an outer cladding layer index of refraction, where the core index of refraction is greater than the inner cladding index of refraction and the inner cladding index of refraction is greater than the outer cladding layer index of refraction;
    a second fiber array including a plurality of fibers, each fiber in the second fiber array including a cladding layer having the cladding index of refraction and a multimode core having a multimode core index of refraction that is about the same as the inner cladding layer index of refraction, where the multimode core index of refraction is greater than the cladding layer index of refraction; and
    an optical fusion layer between the first array and the second array, said fusion layer being formed from a fusion material having a fusion layer index of refraction, wherein the fusion layer index of refraction is greater than the inner cladding layer index of refraction and greater than the outer cladding layer index of refraction, and wherein the fusion layer fuses the first array to the second array so that the fusion layer, a portion of the outer cladding layer of the first array, a portion of the inner cladding layer, a portion of the cladding layer of the second array and a portion of the multimode core fuse together in each fiber so that pump light introduced into the second array will propagate into the first array.

10. The laser according to claim 9 further comprising a cylindrical bobbin, said first array being an array ribbon wrapped around the bobbin and said second array being an array ribbon wrapped around the first array.

11. The laser according to claim 10 wherein the bobbin is made of a heat conductive material.

12. The laser according to claim 11 further comprising a cooling system, said cooling system causing a cooling fluid to flow through the bobbin.

13. The laser according to claim 9 wherein the fusion material is silica doped with germanium.

14. The laser according to claim 9 wherein the combination of the outer cladding layers of the first array and the cladding layers of the second array that are not in contact with the fusion layer confine the pump light in the first and second arrays.

15. A method of making a dual-clad fiber laser, said method comprising the steps of:
    forming a first array, said first array including a plurality of fibers where each fiber in the first array includes a single mode core, a multi-mode inner cladding layer, and an outer cladding layer;
    forming an optical frit layer on the first array;
    forming a second fiber array over the optical frit layer, said second fiber array including a plurality of fibers where each fiber in the second array includes a cladding layer and a multimode core; and
    heating the first and second fiber arrays so that the frit layer and a portion of the outer cladding layers, the inner cladding layers and the multimode cores fuse together to form a fusion layer having substantially the same index of refraction as the inner cladding layer and the multimode core.

16. The method according to claim 15 wherein the step of forming an optical frit layer includes forming a silica frit layer doped with germanium.

17. The method according to claim 15 further comprising the step of wrapping the first and second fiber arrays on a bobbin.

18. The method according to claim 15 further comprising the step of providing a cooling system within the bobbin.

19. A dual-clad fiber laser for amplifying an optical signal, said laser comprising:

a one-dimensional signal fiber ribbon array responsive to the optical signal, each fiber in the signal fiber ribbon array including a single mode core, an inner cladding layer and an outer cladding layer;

a one-dimensional pump fiber ribbon array responsive to pump light, each fiber in the pump fiber ribbon array including a multimode core and an outer cladding layer, said signal fiber ribbon array being fused to the pump fiber ribbon array at a fusion region along a length of the signal fiber array, wherein the fusion region, the inner cladding layer and the multimode core have substantially the same index of refraction so that the pump signal enters the fibers in the signal fiber ribbon array from the pump fiber ribbon array, and wherein the outer cladding layers of the signal fibers and the pump fibers confine the pump signal within the combination of the signal fiber ribbon array and the pump fiber ribbon array;

a bobbin, said signal fiber ribbon array being wrapped around the bobbin and the pump fiber ribbon array being wrapped around the signal fiber ribbon array, and a cooling system for cooling the bobbin.

* * * * *